(12) United States Patent
Amalric

(10) Patent No.: US 10,532,829 B2
(45) Date of Patent: Jan. 14, 2020

(54) ORBIT TRANSFER METHOD FOR A SPACECRAFT USING A CONTINUOUS OR QUASI-CONTINUOUS THRUST AND EMBEDDED DRIVING SYSTEM FOR IMPLEMENTING SUCH A METHOD

(71) Applicant: THALES, Courbevoie (FR)

(72) Inventor: Joël Amalric, Cannes-la-Bocca (FR)

(73) Assignee: THALES, Courbevoie (FR)

(\*) Notice: Subject to any disclaimer, the term of this patent is extended or adjusted under 35 U.S.C. 154(b) by 691 days.

(21) Appl. No.: 15/347,579

(22) Filed: Nov. 9, 2016

(65) Prior Publication Data

US 2017/0297746 A1    Oct. 19, 2017

(30) Foreign Application Priority Data

Nov. 20, 2015    (FR) ...................... 15 02429

(51) Int. Cl.
*B64G 1/00*    (2006.01)
*B64G 1/36*    (2006.01)
*B64G 1/40*    (2006.01)
*B64G 1/26*    (2006.01)
(Continued)

(52) U.S. Cl.
CPC .............. *B64G 1/007* (2013.01); *B64G 1/26* (2013.01); *B64G 1/405* (2013.01); *G05D 1/04* (2013.01); *G01S 19/13* (2013.01)

(58) Field of Classification Search
CPC ....... B64G 1/0007; B64G 1/36; G05D 1/0883
See application file for complete search history.

(56) References Cited

U.S. PATENT DOCUMENTS

| 6,845,950 B1* | 1/2005 | Goodzeit | B64G 1/007 244/158.6 |
| 2014/0166814 A1* | 6/2014 | Dargent | B64G 1/007 244/158.8 |

(Continued)

FOREIGN PATENT DOCUMENTS

| EP | 2 738 103 A1 | 6/2014 |
| EP | 2 921 923 A1 | 9/2015 |

OTHER PUBLICATIONS

Seungwon Lee et al., "Design and optimization of low-thrust orbit transfers," 2005 IEEE Aerospace Conference, Mar. 5, 2005, pp. 855-869, XP031330382.

(Continued)

*Primary Examiner* — Philip J Bonzell
*Assistant Examiner* — Tye William Abell
(74) *Attorney, Agent, or Firm* — Baker & Hostetler LLP

(57) ABSTRACT

An orbit transfer method for a spacecraft using a continuous or quasi-continuous thrust propulsion, the method comprises: the acquisition, at least once in each half-revolution of the spacecraft, of measurements of its position and of its velocity; the computation of a thrust control function as a function of the measurements; and the driving of the thrust in accordance with the control law; wherein the control law is obtained from a Control-Lyapunov function using orbital parameters, preferably equinoctial, of the spacecraft, averaged over at least one half-revolution. An embedded driving system for a spacecraft for implementing such a method and a spacecraft equipped with the driving system are provided.

14 Claims, 5 Drawing Sheets

(51) Int. Cl.
*G05D 1/04* (2006.01)
*G01S 19/13* (2010.01)

(56) References Cited

U.S. PATENT DOCUMENTS

| | | | | |
|---|---|---|---|---|
| 2014/0367524 | A1* | 12/2014 | Andoh | B64G 1/242 244/158.5 |
| 2015/0247730 | A1 | 9/2015 | Calmettes et al. | |
| 2015/0284111 | A1* | 10/2015 | Post | B64G 1/242 244/158.6 |
| 2017/0369192 | A1* | 12/2017 | Kitamura | B64G 1/244 |

OTHER PUBLICATIONS

Eui Dong et al., "Discrete and Continuous Lyapunov-Based Transfer Between Elliptic Keplerian Orbits," Discrete and Continuous Dynamical Systems—Series B, vol. 2, No. 1, Feb. 2002, pp. 57-67, XP055293711.

A.E. Petropoulos et al., "Optimisation of low-thrust orbit transfers using the Q-Law for the initial guess," AAS/AIAA Astrodynamics Specialists Conference, 2005.

Thierry Dargent, "Averaging technique in T-3D an integrated tool for continuous thrust optimal control in orbit transfers," AAS 14-312, (2014), pp. 1599-1615.

A.E. Petropoulos et al., "Techniques for designing many-revolution, electric-propulsion trajectories," AAS 14-373, 2014, pp. 2367-2385.

\* cited by examiner

ORBIT TRANSFER METHOD FOR A SPACECRAFT USING A CONTINUOUS OR QUASI-CONTINUOUS THRUST AND EMBEDDED DRIVING SYSTEM FOR IMPLEMENTING SUCH A METHOD

CROSS-REFERENCE TO RELATED APPLICATIONS

This application claims priority to foreign French patent application No. FR 1502429, filed on Nov. 20, 2015, the disclosure of which is incorporated by reference in its entirety.

FIELD OF THE INVENTION

The invention relates to the field of space flight. It relates to a method for performing the orbit transfer of a spacecraft using a continuous or quasi-continuous thrust, on an embedded driving system of a spacecraft for the implementation of such a method and on a spacecraft equipped with such a system.

BACKGROUND

Spacecraft—artificial satellites or probes—are generally injected by a launch vehicle into a so-called injection earth orbit, which does not correspond to the orbit, not necessarily an earth orbit, that it has to reach to accomplish its mission ("stationing"), for example a geostationary orbit for a telecommunications satellite. Moreover, the missions of space exploration probes generally comprise several phases characterized by different orbits. It is therefore essential to be able to accurately perform orbit transfer manoeuvres.

In the case of "conventional" spacecraft with chemical propulsion, the orbit transfer is performed using thrusts that are very intense and very short relative to an orbit period. Typically, a first thrust ejects the spacecraft from its initial orbit (for example, injection orbit) and positions it on a so-called transfer orbit, which is chosen in such a way as to cross the target, or destination, orbit. When the spacecraft has arrived close to the crossing point, a second thrust places it on said target orbit.

Electric propulsion systems are experiencing significant development because they make it possible to very greatly limit the weight of propellant necessary to impart a given impulse on the spacecraft. That makes it possible to reduce the weight of the craft at launch and/or prolong its life. Electric propulsion provides a thrust that is weaker by several orders of magnitude compared to chemical thrust, but it can be maintained, uninterrupted or intermittently over durations that are comparable (for example, not less than a tenth) to the orbit transfer duration; in this case continuous or "quasi-continuous" thrust applies. The orbit transfer is therefore performed in a very different way to the case of chemical propulsion—by a progressive deformation of the starting orbit. By way of example, FIG. 1 illustrates the gradual transfer from an initial elliptical orbit OI to a circular target orbit OC.

There therefore arises the problem of controlling the intensity and the orientation of the thrust throughout the transfer phase.

Conventionally, the control is performed in open-loop mode: an optimal control law is computed on the ground and transmitted to the on-board computer which drives the propulsion system. At regular intervals, for example once a week, a new control law is recomputed taking into account the real position and velocity of the spacecraft, which generally will not exactly correspond to those expected. Such an approach is cumbersome to implement, because the trajectory optimization computations are very complex (they involve solving a problem of nonlinear optimization under constraints that are also nonlinear). Moreover, between two successive updates of the control law, the spacecraft can deviate significantly from its ideal trajectory which increases the duration of the transfer phase and the consumption of propellant.

The article by Thierry Dargent "Averaging technique in T-3D: an integrated tool for continuous thrust optimal control in orbit transfers," AAS 14-312 (2014) describes a technique for computing a continuous or quasi-continuous thrust optimal control law that can be used in an open-loop approach.

It is also known practice to use so-called stabilization heuristics type techniques, which are based—implicitly—on the minimization of a control-Lyapunov function. A technique of this type, called "Q-Law", used mainly as pre-dimensioning method, is described in the following articles:

A. E. Petropoulos, S. Lee "Optimisation of low-thrust orbit transfers using the Q-Law for the initial guess", AAS/AIAA Astrodynamics Specialists Conference, 2005;

S. Lee et al. "Design and Optimization of Low-thrust Orbit Transfer" in: Aerospace Conference, 2005 IEEE. IEEE, 2005. p. 855-869;

A. E. Petropoulos et al. "Techniques for designing many-revolution, electric-propulsion trajectories", AAS 14-373, 2014.

This technique does not give total satisfaction. On the one hand, it presents problems of instability, notably in the case of orbits with low eccentricity and low inclination, which are of very significant practical interest (simply consider the geostationary orbits, which have a zero eccentricity and inclination), and on the other hand it leads to results that are quite far removed from an optimal control law, unless there is recourse to sophisticated techniques (optimization of weighting coefficients using genetic algorithms). Moreover, it does not make it possible to manage the longitude encounter constraints which are very significant in the case of the stationing of geostationary satellites.

To remedy the drawbacks of the open-loop control, it would be desirable to adopt a closed-loop (feedback loop) approach, in which an embedded processor computes in real time the control to be applied to the propulsion system by taking into account the position and velocity of the spacecraft, determined for example using a satellite navigation system (GNSS, "Global Navigation Satellite System"). Since the computation power of the embedded processors is limited, it does however appear difficult to implement an optimal control law in closed-loop mode.

The invention aims to overcome the abovementioned drawbacks of the prior art, and more particularly to obtain a technique for closed-loop control of the continuous or quasi-continuous thrust to perform an orbit transfer which is at the same time stable, simple to implement and close to optimal. Advantageously, such a technique can make it possible to manage the longitude encounter constraints.

According to the invention, this aim is achieved by virtue of the use of a heuristic control law which, as in the case of the Q-Law, is obtained from a Control-Lyapunov function but which:

expresses this function by means of equinoctial orbital parameters, instead of the "conventional" orbital parameters used in the prior art; and uses (equinoctial) orbital parameters averaged over at least one half-period of revolution.

SUMMARY OF THE INVENTION

Thus, one subject of the invention is an orbit transfer method for spacecraft using a continuous or quasi-continuous thrust propulsion, the method comprising:

the acquisition, at least once in each revolution of the spacecraft, of measurements of its position and of its velocity;

the computation of a thrust control function as a function of said measurements; and the driving of said thrust in accordance with said control law; characterized in that said control law is obtained from a control-Lyapunov function proportional to a term-weighted sum, each term being representative of a quadratic error between a measured orbital parameter of an orbit of the spacecraft averaged over at least one half-revolution and the corresponding orbital parameter of a final target orbit, normalized relative to the maximum value of the drift, averaged over at least one half-revolution, of said orbital parameter of said spacecraft.

According to particular embodiments of such a method:

Said or each said orbital parameter can be an equinoctial orbital parameter.

The acquisition of said position and velocity measurements can be performed on board said spacecraft by means of a GNSS receiver.

Said computation of a control function can be performed by an embedded processor on board said spacecraft.

Said control-Lyapunov function can comprise at least one multiplying term consisting of a barrier function imposing a maximum or minimum altitude constraint on said spacecraft.

The weights of said weighted sum can be constant and non-negative. More particularly, they can all be equal.

As a variant, the method can comprise a step of numerical optimization of the weights of said weighted sum, this step being performed by a computer on the ground before the start of the transfer and at least once during the transfer.

The method can also comprise, after an initial phase of the transfer:

the computation of an estimation of a longitude encounter error on the final target orbit;

the modification, in said control-Lyapunov function, of an orbital parameter of said final target orbit representing the half-major axis thereof or of a weighting coefficient of this parameter; and during a terminal phase of the transfer, the maintenance of a constant value of said orbital parameter and of its weighting coefficient.

Said propulsion can be of electric type.

The driving of said thrust can comprise the determination of at least its orientation.

Another subject of the invention is an embedded system for driving a spacecraft comprising:

a continuous or quasi-continuous thrust propulsion system;

a GNSS receiver configured to acquire, at least once in each revolution of the spacecraft, measurements of its position and of its velocity;

a processor programmed to compute a thrust control function as a function of said measurements and to drive said continuous or quasi-continuous thrust propulsion system in accordance with said control law; characterized in that said processor is programmed to compute said control law from a Lyapunov control function proportional to a term-weighted sum, each term being representative of a quadratic error between a measured orbital parameter of an orbit of the spacecraft averaged over at least one half-revolution and the corresponding orbital parameter of a final target orbit normalized relative to the maximum value of the rate of change of said orbital parameter, averaged over at least one half-revolution of said spacecraft.

Advantageously, said or each said orbital parameter is an equinoctial orbital parameter.

Yet another subject of the invention is a spacecraft equipped with such an embedded driving system.

BRIEF DESCRIPTION OF THE DRAWINGS

Other features, details and advantages of the invention will emerge on reading the description given with reference to the attached drawings given by way of example and which represent, respectively.

DETAILED DESCRIPTION

As has been mentioned above, the invention uses a control law obtained from a control-Lyapunov function. It is therefore important to define such a function and its use to obtain a control law.

Consider a system governed by the differential equation $$\dot{x}=f(x,u) \tag{1}$$

in which x is a state vector which, in the case considered here, represents the deviation between the measured orbital parameters of a spacecraft and the parameters of the target orbit, u is a control vector which defines the thrust (orientation and possibly intensity) and f(x,u) is the function, deriving from the laws of orbital mechanics, which expresses the time variation of the state vector as a function of the present value of this vector and of the control. A control-Lyapunov function V(x) is a continuously derivable function, strictly positive for any x except x=0, such as V(x=0)=0 and $$\forall x \neq 0 \exists u \dot{V}(x,\ u)=\Delta V(x)f(x,u)<0 \tag{2}.$$

For the state vector to evolve towards its target x=0 (that is to say for the orbit of the spacecraft to tend towards the target orbit), V(x) must be minimized; it is therefore essential to choose a control u which renders its time derivative $\dot{V}(x,u)$ as negative as possible. It is therefore natural to take $$u=\arg\min_{\{u\}}\dot{V} \tag{3}.$$

The aim is therefore to find a control-Lyapunov function which provides, via the equation (3), a control law that is close to optimality. Optimality can be defined, for example, by a minimum transfer time, a minimal consumption of propellant or by a combination of these objectives.

Figure 1:
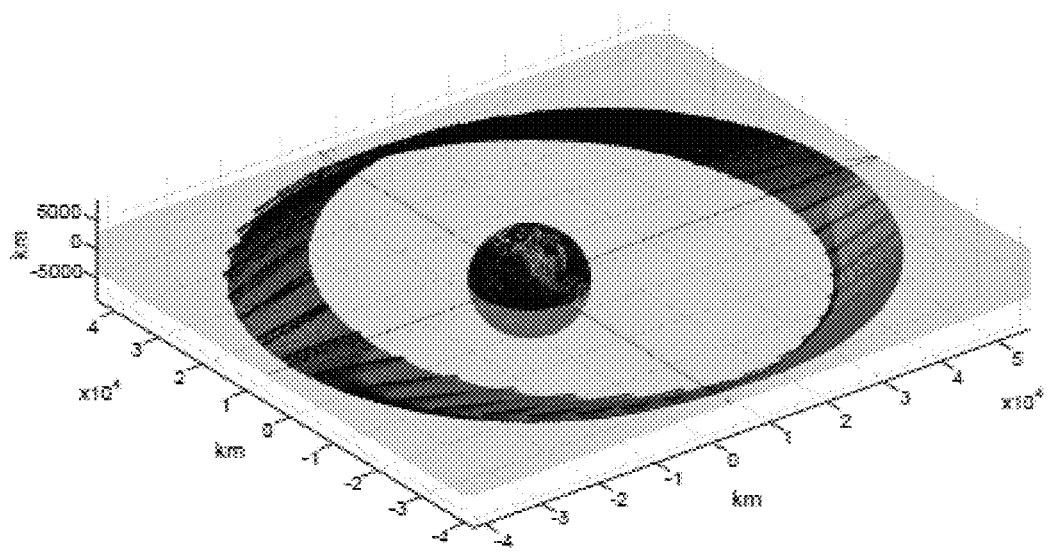
FIG. 1, the orbit transfer of a satellite obtained by using a continuous or quasi-continuous thrust.
Figure 2:
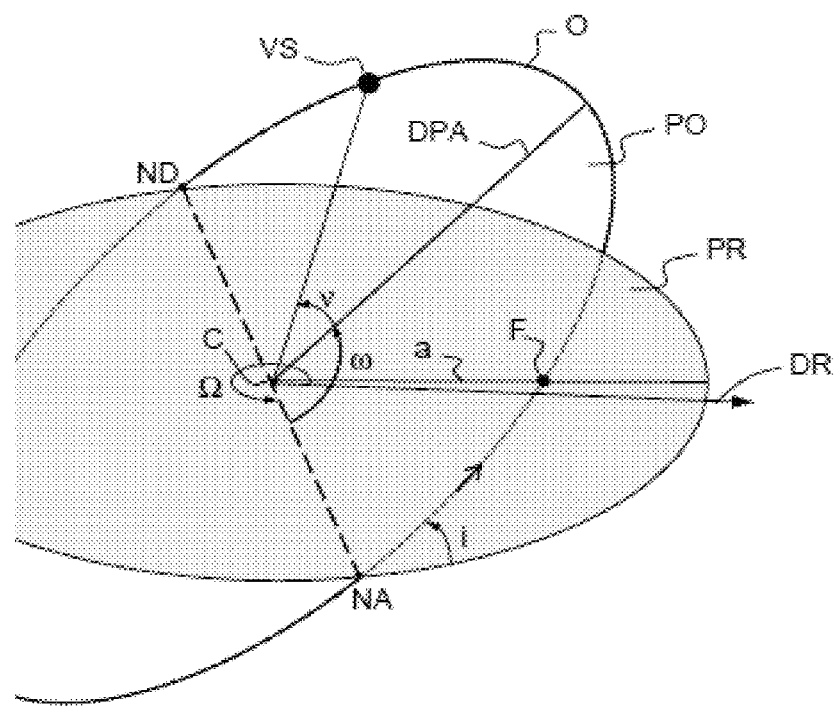
FIG. 2, the definition of the orbital parameters.

Before proposing a form for the control-Lyapunov function it is a good idea to look into the choice of the state vector x. According to the prior art, this vector is defined from the five "conventional" orbital parameters, which are illustrated using FIG. 2:

the half-major axis "a" of the orbit O (assumed circular or elliptical);

the eccentricity "e" (ratio of the centre C-focus F distance to the half-major axis a; has the value 0 in the case of a circular orbit and is strictly between 0 and 1 for an elliptical orbit);

the inclination "i" of the orbital plane PO relative to a reference plane PR, which can for example be the ecliptic or the equator;

the longitude of the ascending node NA "Ω", measured relative to a reference direction DR;

the argument of the periastron "ω", which is the angle formed by the line of the nodes NA-ND and the direction of the periastron DPA in the orbital plane.

These orbital parameters present the drawback of being ill-defined, and therefore of having singular movement equations (division by zero), for low eccentricities (e≈0) and for low inclinations (i≈0). For this reason, the invention uses so-called "equinoctial" orbital parameters, of which the movement equations are never singular and which are defined by:

$$\begin{bmatrix} a \\ e_x \\ e_y \\ h_x \\ h_y \\ L \end{bmatrix} = \begin{bmatrix} a \\ e\cos(\Omega + \omega) \\ e\sin(\Omega + \omega) \\ \tan(i/2)\cos(\Omega) \\ \tan(i/2)\sin(\Omega) \\ \Omega + \omega + v \end{bmatrix} \quad (4)$$

in which v is the true anomaly, that is to say the angle between the direction of the periastron DPA and the line linking the centre C to the position of the spacecraft VS. It will be noted that the parameters $e_x$, $e_y$ can be considered the components of an "eccentricity" vector of modulus "e" and having the direction of the perigee for polar angle, whereas the parameters $h_x$, $h_y$ are the components of an "inclination" vector of modulus $\tan(i/2)$ and having the direction of the ascending node for polar angle.

The use of the equinoctial orbital parameters is not an essential feature of the invention. If the target orbit exhibits a not-inconsiderable eccentricity and inclination, it is also possible to use conventional orbital parameters.

The orbital parameters—conventional or equinoctial—are defined only for a Kepler orbit, which is not the case of a spacecraft subjected to a thrust. However, by knowing, at each instant, the position and the velocity of the spacecraft, it is possible to compute the parameters of its osculating orbit, that is to say the orbit the craft would follow if the propulsion was instantaneously cut and in the absence of any other disturbance. The position and the velocity of the spacecraft are generally known by virtue of the use of a GNSS navigation system—by direct measurement or interpolation between two successive measurements.

The invention does not use the orbital parameters measured (or, to be more precise, computed from the measurements) as such, but these parameters averaged over at least one half-period of revolution of the spacecraft. In effect, the measured orbital parameters oscillate at the orbital frequency, which is detrimental to the stability of the control; these oscillations are eliminated by the averaging operation.

A control-Lyapunov function according to an embodiment of the invention can be written as a weighted sum of average quadratic errors of the equinoctial orbital parameters. More specifically, it can be given by:

$$V(\bar{a}, \bar{e}_x, \bar{e}_y, \bar{h}_x, \bar{h}_y) = w_a \left( \frac{\bar{a} - \bar{a}_T}{\dot{\bar{a}}_{max}} \right)^2 + w_{e_x} \left( \frac{\bar{e}_x - \bar{e}_{x,T}}{\dot{\bar{e}}_{x,max}} \right)^2 + \quad (5)$$

$$w_{e_y} \left( \frac{\bar{e}_y - \bar{e}_{y,T}}{\dot{\bar{e}}_{y,max}} \right)^2 + w_{h_x} \left( \frac{\bar{h}_x - \bar{h}_{x,T}}{\dot{\bar{h}}_{x,max}} \right)^2 + w_{h_y} \left( \frac{\bar{h}_y - \bar{h}_{y,T}}{\dot{\bar{h}}_{y,max}} \right)^2$$

in which $\bar{a}$, $\bar{e}_x$, $\bar{e}_y$, $\bar{h}_x$, $\bar{h}_y$ are the equinoctial orbital parameters of the orbit of the spacecraft averaged over at least one half-revolution, are the $\bar{a}_T$, $\bar{e}_{x,T}$, $\bar{e}_{y,T}$, $T_T$, $\bar{h}_{x,T}$, $\bar{h}_{y,T}$ are the equinoctial orbital parameters of the target orbit, $\dot{\bar{a}}_{max}$, $\dot{\bar{e}}_{x,max}$, $\dot{\bar{e}}_{y,max}$, $\dot{\bar{h}}_{x,max}$, $\dot{\bar{h}}_{y,max}$ are the secular drifts (that is to say the average time derivatives) of the parameters $\bar{a}$, $\bar{e}_x$, $\bar{e}_y$, $\bar{h}_x$, $\bar{h}_y$ obtained by application of the control law which maximizes these secular drifts or, in an equivalent manner, the orbital increment of each orbital parameter and $w_j$ (j=a, $e_x$, $e_y$, $h_x$, $h_y$) are weighting coefficients that are non-negative and preferably strictly positive. In the simplest embodiment, which nevertheless gives satisfactory results, these weighting coefficients can all be equal to one another, and notably taken to be equal to 1. In a variant, in order to get closer to the optimality control law, it is possible to proceed with a numerical optimization of these performance levels. This optimization can be performed on the ground, before the start of the transfer, for example by taking the transfer time as cost function to be minimized. It is also possible to repeat the optimization during the transfer with a very low repetition rate (for example once every three months), which entails transmitting the new optimized parameters to the embedded processor of the spacecraft.

In practice, to find the values $\dot{\bar{a}}_{max}$, $\dot{\bar{e}}_{x,max}$, $\dot{\bar{e}}_{y,max}$, $\dot{\bar{h}}_{x,max}$, $\dot{\bar{h}}_{y,max}$, the control law which maximizes the variation of each equinoctial orbital element for each orbital position L is integrated; then, each time derivative over the period considered and over all the values of L is averaged, leaving the other orbital elements constant. This integration can be done numerically or analytically.

The abovementioned article "Optimisation of low-thrust orbit transfers using the Q-Law for the initial guess" also recommends an optimization of the weighting coefficients of the Q-law but by using genetic algorithms which prove very cumbersome from the computational point of view. In the case of the invention, by virtue of the use of average orbital parameters, it is possible to use simpler nonlinear optimization techniques.

It is possible to impose altitude constraints (altitude of the periastron $r_p$ greater than or equal to a first threshold $r_{p,min}$ and/or altitude of the apastron $r_p$ less than or equal or a second threshold $r_{a,max}$) by multiplying the function V(x) given by the equation (5) by corresponding barrier functions $B_\varepsilon^-$, $B_{249}^+$ characterized by a numerical smoothing parameter ε. A barrier function is a continuous (preferably derivable) function of which the value tends rapidly towards infinity in approaching a limit value, while remaining relatively flat far from this value. The constrained control-Lyapunov function can be written:

$$V_{con}(\bar{a}, \bar{e}_x, \bar{e}_y, \bar{h}_x, \bar{h}_y) = \qquad (6)$$

$$B_\varepsilon^+\left(\frac{r_p(\bar{a}, \bar{e}_x, \bar{e}_y)}{r_{p,min}}\right) B_\varepsilon^-\left(\frac{r_a(\bar{a}, \bar{e}_x, \bar{e}_y)}{r_{a,max}}\right) V(\bar{a}, \bar{e}_x, \bar{e}_y, \bar{h}_x, \bar{h}_y)$$

The use of a control-Lyapunov function expressed as a function of average orbital parameters offers several advantages:

the average parameters do not oscillate at the orbital frequency (unlike the non-averaged measured orbital parameters); that allows for a rapid integration of the differential equation (1), necessary for computing the control vector u via the equation (3) applied to the averaged dynamics system with a time step which can be several revolutions;

the desired trend of the thrust is smoother;

the time trend of the half-major axis is monotonic (see FIG. 6a), which makes it possible to implement a simple method to satisfy a terminal longitude encounter condition.

This method consists, on approaching the target orbit, in:

predicting the longitude of arrival on the target orbit, and estimating the encounter error relative to the desired longitude;

modifying, in the control-Lyapunov, function, the parameter $\bar{a}_T$ by dynamically computing a small deviation to the target to adjust the average drift in geographic longitude; and before the end of the transfer, restoring the initial value of this parameter.

The idea is to provide the longitude of arrival and, if it does not correspond to the target, to modify the parameter $\bar{a}_T$ so as to correct the error. In an equivalent manner, that amounts to changing the numerical weight associated with the half-major axis in a ratio equal to $\{(\bar{a}-\bar{a}_T^1)/(\bar{a}-\bar{a}_T)\}^2$. This correction is dynamic in as much as it has to be recomputed several times along the transfer trajectory, because the prediction of the longitude of arrival is affected by an error which tends to decrease in time.

Generally, it is pointless to implement the correction more than one or two months before the predicted date of arrival on the target orbit, because the prediction errors would be too great. Furthermore, the correction must be stopped at least one or two weeks before the predicted date of arrival to avoid having the amplitude of the corrections diverge (when there is little time left, a significant modification $\bar{a}_T$ is necessary to even slightly change the longitude of arrival). In the final phase of the transfer, the last modified value of the parameter $\bar{a}_T$ or the last modified value of its weight is kept.

Figure 3:
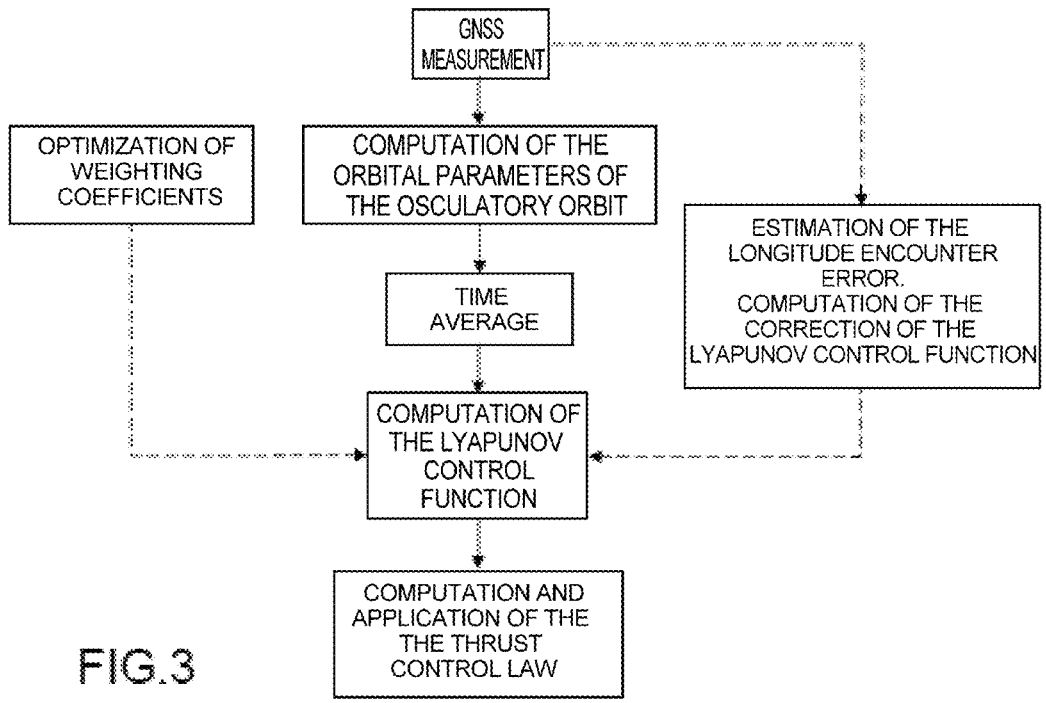
FIG. 3, the flow diagram of a method according to an embodiment of the invention.

FIG. 3 shows a flow diagram of a method according to the invention.

The first step is to measure the position and the velocity of the spacecraft, performed by GNSS (or by telemetry, but the autonomy of the craft is then lost) at least once per revolution. That makes it possible to determine, at a plurality of instants, the (equinoctial) orbital parameters of the spacecraft, which are then averaged. The average parameters thus obtained are used to compute the control-Lyapunov function. The weighting coefficients of this function can be optimized periodically by a computer located on the ground, and transmitted to the embedded processor. Furthermore, a target parameter can be modified temporarily to correct an estimated longitude encounter error, this estimation being in turn computed from the RGNSS measurements. Next, the control-Lyapunov function is used to compute the control function u, which drives the continuous or quasi-continuous propulsion system.

In practice, a GNSS receiver acquires position and velocity measurements at a high rate (several times per minute), but a filtering is generally performed on these measurements to retain only a few acquisitions (typically between 1 and 4) per revolution.

Figure 4:
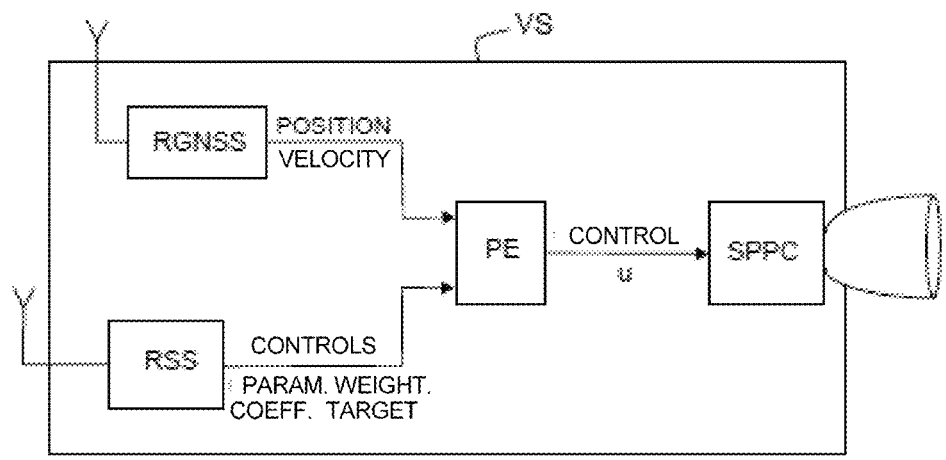
FIG. 4, a simplified functional diagram of a spacecraft equipped with a driving system according to an embodiment of the invention.

FIG. 4 is a very simplified functional diagram of a spacecraft VS equipped with a driving system according to the invention. The driving system comprises: a GNSS receiver (reference GNSS) which supplies position and velocity measurements; optionally a receiver (reference RSS) which receives, from a ground station, updates of the weighting parameters of the control-Lyapunov function and/or updates of the parameters of the target orbit and/or of other controls; an embedded processor PE which receives the position and velocity signals from the GNSS receiver (and possibly the data originating from the RSS receiver) and which computes a control signal u; and a continuous or quasi-continuous thrust propulsion system (generally electrical) which receives and applies this control signal.

A method according to the invention has been tested for the case of the stationing of a geostationary satellite from an elliptical and inclined injection orbit. Table 1 below gives the (conventional) orbital parameters of the initial orbit and of the target orbit:

TABLE 1

| Orbital parameters | Initial orbit | Target orbit |
| --- | --- | --- |
| Half-major axis (a) | 24505.9 km | 42165 km |
| Eccentricity (e) | 0.725 | 0.001 |
| Inclination (i) | 7.05 deg | 0.05 deg |
| Ascending node long (Ω) | 0 deg | free |
| Argument of the perigee (ω) | 0 deg | free |

The "free" parameters are processed by setting the corresponding weight $w_j$ to zero, or by setting an orbital target equal to the initial parameter (this second method works less well than the first if the natural disturbances in dynamics are considered).

The satellite has an initial weight of 2000 kg, uses a propellant (Xenon) of specific impulse of 2000 s and its electrical propulsion system has a thrust of 0.35 N. Minimal time solutions were considered, in which the thrust always takes its maximum value and only its orientation is driven.

Table 2 illustrates the performance levels obtained by using an "optimal" driving, in the sense that it minimizes the duration of the transfer, computed by means of the T_ 3D technique (see the article by T. Dargent cited above) and by the method of the invention (with unitary weighting coefficients). The performance metrics considered are the transfer duration (in days), the consumption of propellant (in kg) and the Delta-V.

| Performance metric | T_3D | Invention |
| --- | --- | --- |
| Transfer duration | 137.289 days | 138.735 days |
| Consumption of propellant | 211.673 kg | 213.903 kg |
| Delta-V | 2194.1 m/s | 2218.5 m/s |

These results are very satisfactory, because the method according to the invention brings about a very low cost overhead (1.05% for the transfer duration and the consumption of propellant, 1.01% for the Delta-V) compared to the optimal solution while being much less costly in terms of computation resources, which makes it possible to be implemented by an embedded processor. Also, these performance levels could be further improved by optimizing the weighting coefficients of the control-Lyapunov function.

The application of the Q-Law (see the abovementioned article "Techniques for designing many-revolution, electric-propulsion trajectories", case B) leads to a significantly higher Xenon consumption: 221 kg. The use of an optimization by genetic algorithm makes it possible to reduce this consumption to 213 kg, but at the cost of a considerable increase in computational complexity.

Figure 5A:
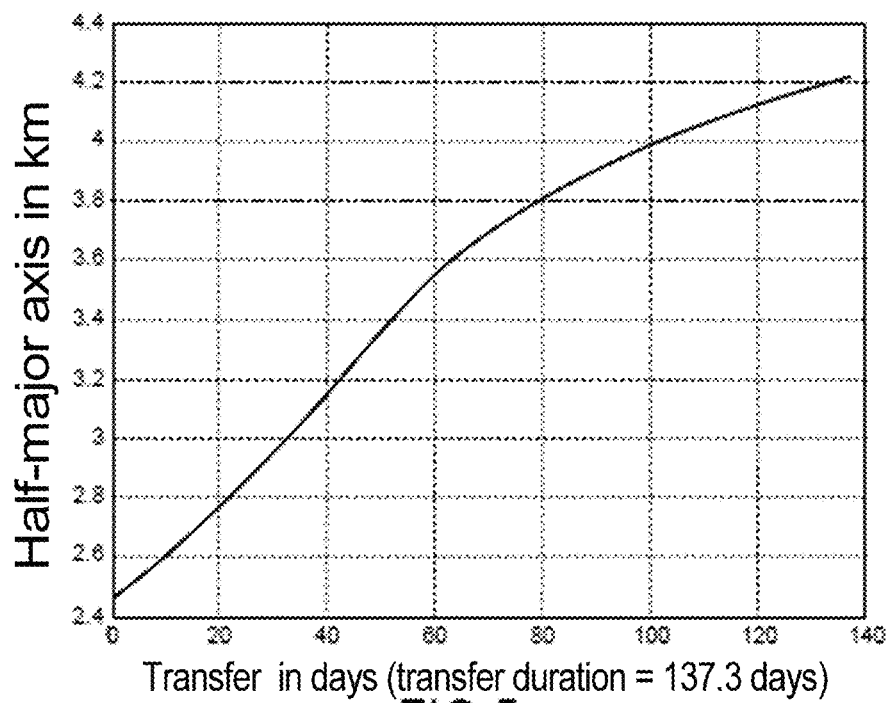
FIGS. 5a to 5d, graphs illustrating the implementation of a driving method according to the prior art.
Figure 5B:
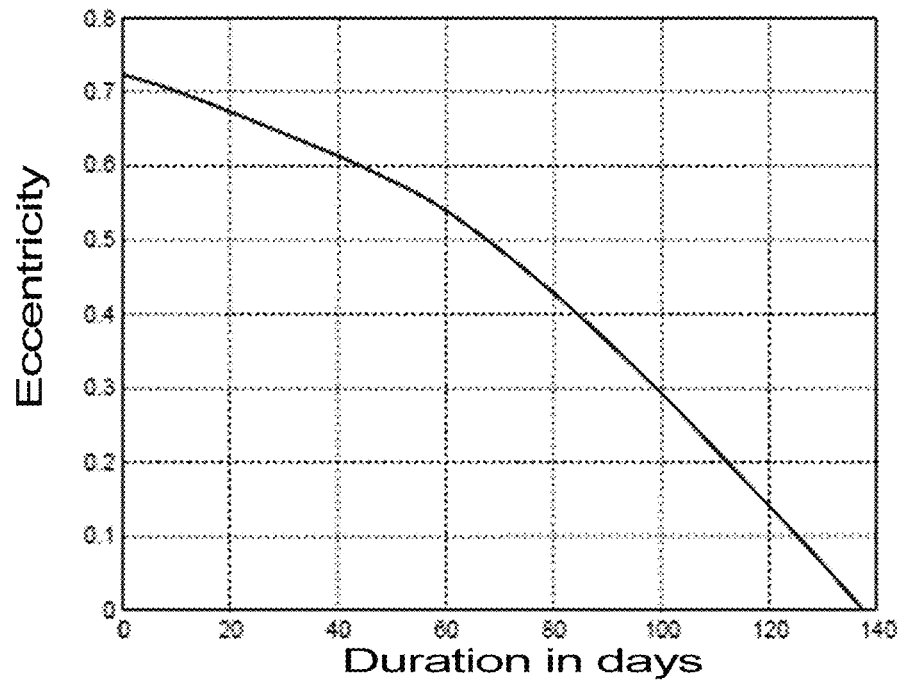
Figure 5C:
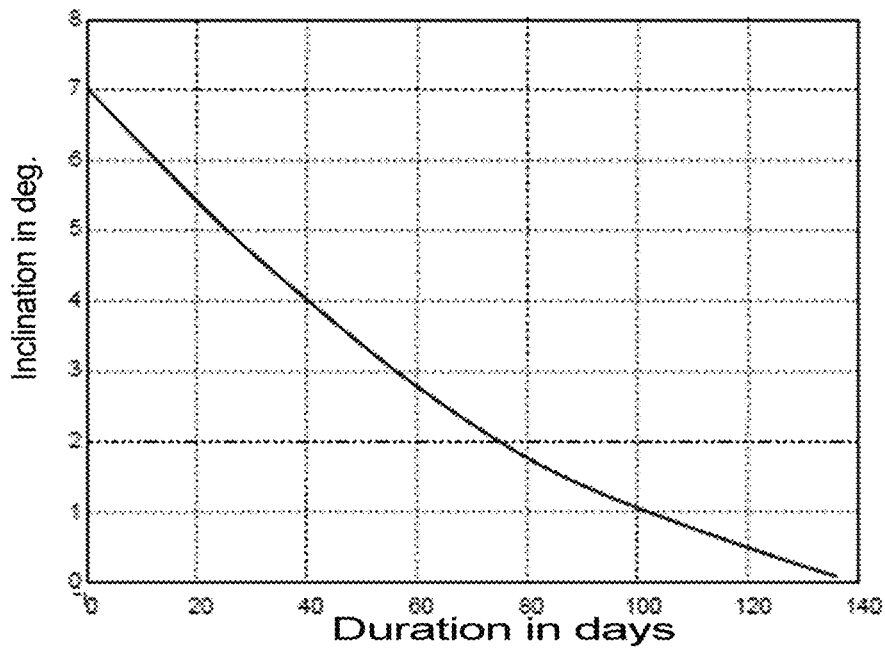

FIGS. 5a to 5d make it possible to follow the history of the orbital transfer obtained by the T_ 3D method. More specifically:

FIG. 5a shows the time trend of the half-major axis of the orbit;

FIG. 5b shows the time trend of the eccentricity;

FIG. 5c shows the time trend of the inclination; and

Figure 5D:
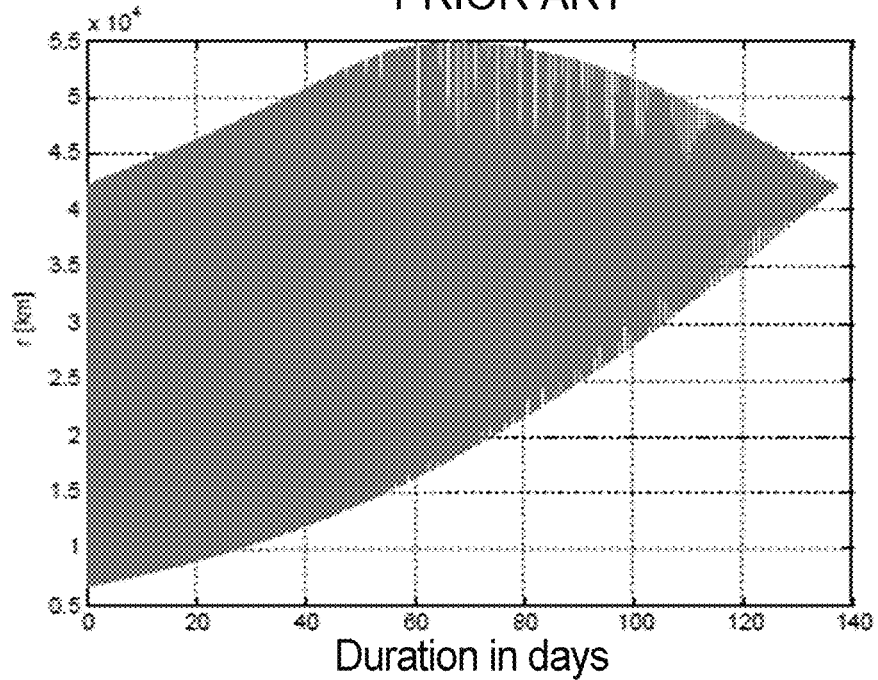

FIG. 5d shows the time trend of the orbital radius which oscillates greatly with the half-orbital period.

Figure 6A:
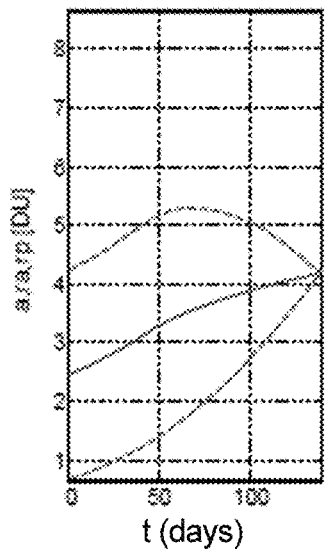
FIGS. 6a to 6c and 7a, 7b, graphs illustrating the implementation of a driving method according to an embodiment of the invention.
Figure 6B:
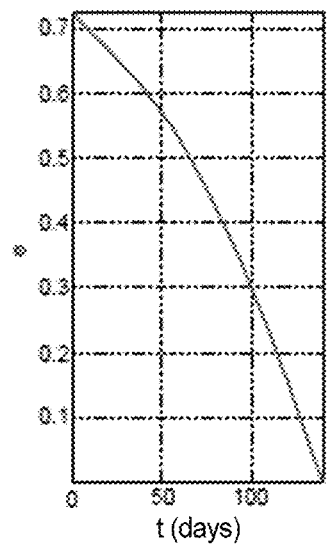
Figure 6C:
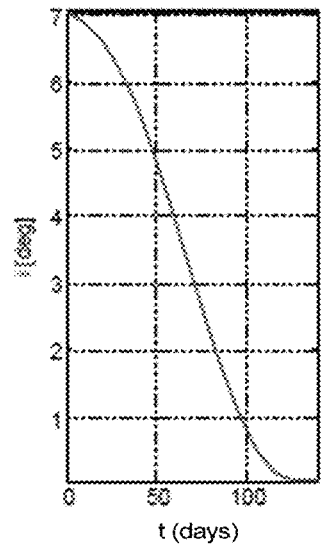

FIGS. 6a to 6c make it possible to follow the history of the orbital transfer obtained by the method according to the invention. More specifically:

FIG. 6a shows the time trend of the radius at the apogee ra (highest dotted line curve), at the radius of the perigee rp (lowest dotted line curve) and of the half-major axis a (continuous line curve); it can be seen that the trend of the half-major axis is monotonic, which makes it possible to impose observance of a longitude encounter condition, as was explained above. The trend of the radius at the apogee, however, is not monotonic because it proves optimal in raising the apogee to make the correction of the inclination more effective. The unit of length used for the y axis, designated DU, corresponds to 10 000 km.

FIG. 6b shows the time trend of the eccentricity; and

FIG. 6c shows the time trend of the inclination.

The profiles of the half-major axis and of the eccentricity very closely resemble those of the optimal control solutions. On the other hand, the inclination profile is substantially different, particularly at the end of transfer. This means that there are numerous trajectories, mutually different but which are "quasi-optimal". The method according to the invention makes it possible to find one of them.

Figure 7A:
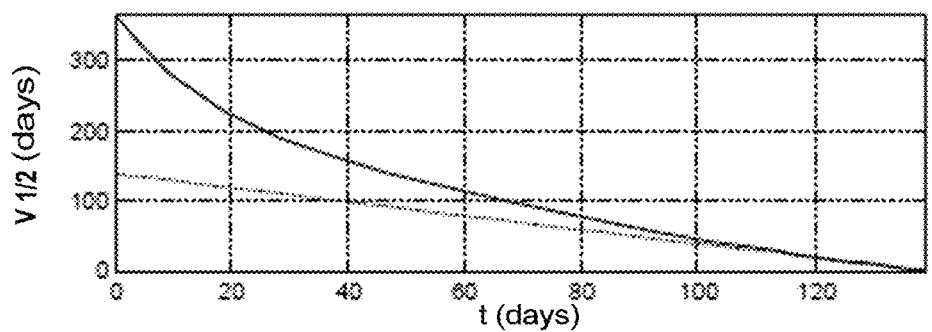
Figure 7B:
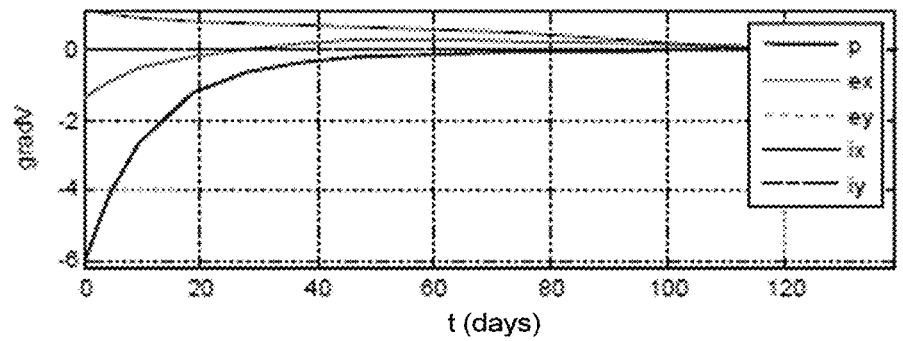

FIG. 7a shows the trend of the control-Lyapunov function—in fact, of its square root, the dimension of which is that of a time, and which can be considered an approximation by excess of the remaining duration of the transfer. The dotted line represents the true remaining duration, determined a posteriori. FIG. 7b represents the derivatives of the control-Lyapunov function relative to the equinoctial orbital parameters, which make it possible to determine the direction of the thrust.

The invention claimed is:

1. An orbit transfer method for a spacecraft using a continuous or quasi-continuous thrust propulsion, the method comprising:
   acquisition, at least once in each revolution of the spacecraft, of measurements of a position of the spacecraft and of a velocity of the spacecraft;
   computation of a thrust control function as a function of said measurements; and
   driving of said thrust propulsion in accordance with a control law;
wherein said control law is obtained from a control-Lyapunov function proportional to a term-weighted sum, each term being representative of a quadratic error between a measured orbital parameter of an orbit of the spacecraft averaged over at least one half-revolution and the corresponding orbital parameter of a final target orbit, normalized relative to a maximum value of a drift, averaged over at least one half-revolution, of said orbital parameter of said spacecraft.

2. The method according to claim 1, wherein each said orbital parameter is an equinoctial orbital parameter.

3. The method according to claim 1, wherein the acquisition of said position and velocity measurements is performed on board said spacecraft by means of a Global Navigation Satellite System receiver.

4. The method according to claim 1, wherein said computation of the thrust control function is performed by an embedded processor on board said spacecraft.

5. The method according to claim 1, wherein said control-Lyapunov function comprises at least one multiplying term consisting of a barrier function imposing a constraint of a maximum or a minimum altitude of said spacecraft.

6. The method according to claim 1, comprising a step of numerical optimization of weights of said term-weighted sum, performed by a computer on Earth before a start of the orbit transfer and at least once during the orbit transfer.

7. The method according to claim 1, also comprising, after an initial phase of the orbit transfer:
   computation of an estimation of a longitude encounter error on the final target orbit;
   modification, in said control-Lyapunov function, of an orbital parameter of said final target orbit representing a half-major axis thereof or of a weighting coefficient of said parameter; and
   during a terminal phase of the orbit transfer, maintenance of a constant value of said orbital parameter and of weighting coefficient.

8. The method according to claim 1, wherein said thrust propulsion is of electric type.

9. The method according to claim 1, wherein the driving of said thrust propulsion comprises the determination of at least an orientation of said thrust propulsion.

10. The method according to claim 1, wherein weights of said term-weighted sum are constant and non-negative.

11. The method according to claim 10, wherein the weights of said term-weighted sum are all equal.

12. An embedded system for driving a spacecraft comprising:
   a continuous or quasi-continuous thrust propulsion system;
   a Global Navigation Satellite System receiver configured to acquire, at least once in each revolution of the spacecraft, measurements of a position of the spacecraft and of a velocity of the spacecraft;
   a processor programmed to compute a thrust control function as a function of said measurements and to drive said continuous or quasi-continuous thrust propulsion system in accordance with a control law;
   wherein said processor is programmed to compute said control law from a Control-Lyapunov function proportional to a term-weighted sum, each term being representative of a quadratic error between a measured orbital parameter of an orbit of the spacecraft averaged over at least one half-revolution and a corresponding orbital parameter of a final target orbit normalized relative to a maximum value of the rate of change of said measured orbital parameter, averaged over at least one half-revolution of said spacecraft.

13. The system according to claim 12, wherein each said orbital parameter is an equinoctial orbital parameter.

14. A spacecraft equipped with an embedded driving system according to claim 12.

* * * * *